Feb. 25, 1941.  D. SEITZ  2,232,872
CABLE SEALING MEANS
Filed May 25, 1938   3 Sheets-Sheet 1
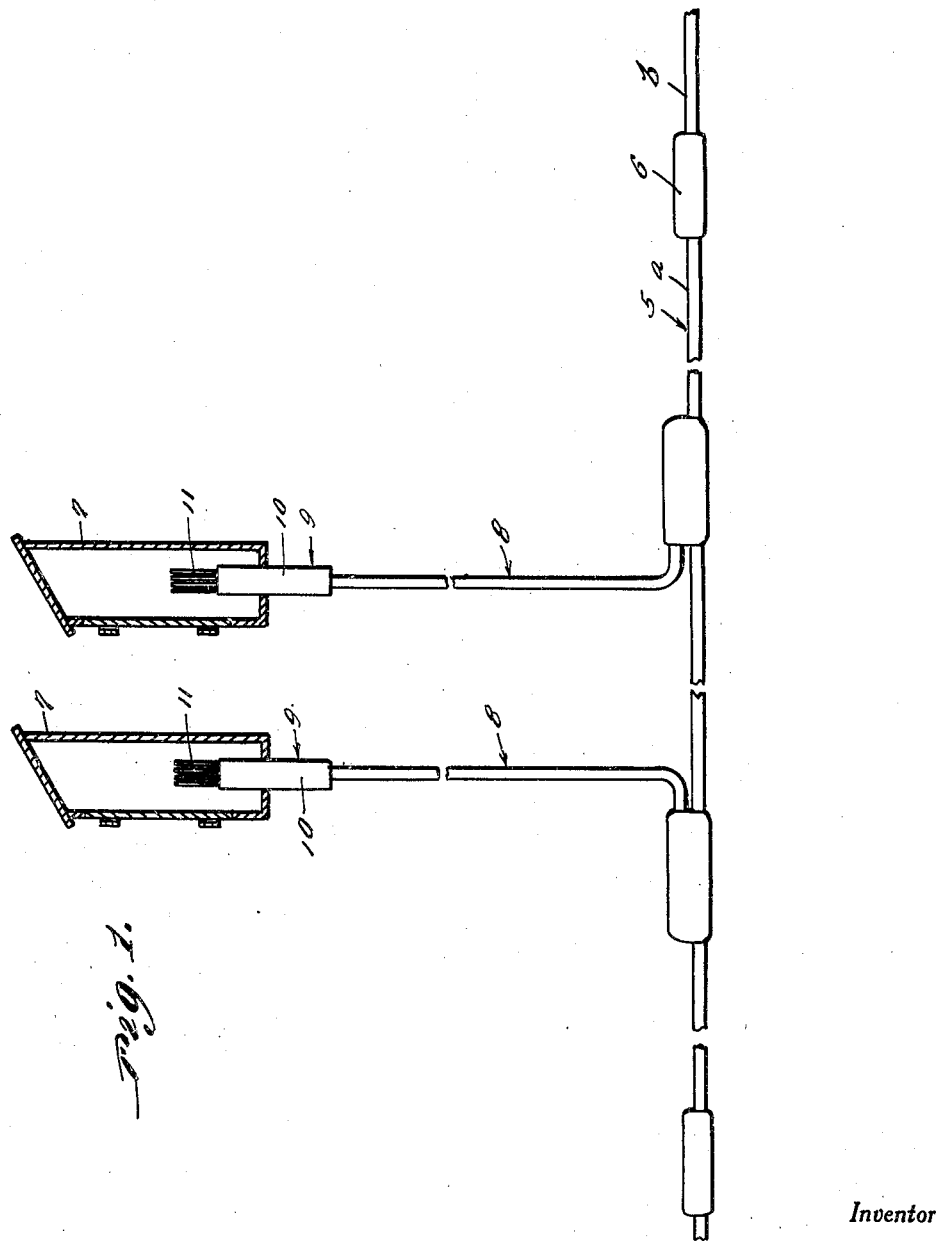
Inventor
Daniel Seitz
By Clarence A. O'Brien
and Hyman Berman
Attorneys

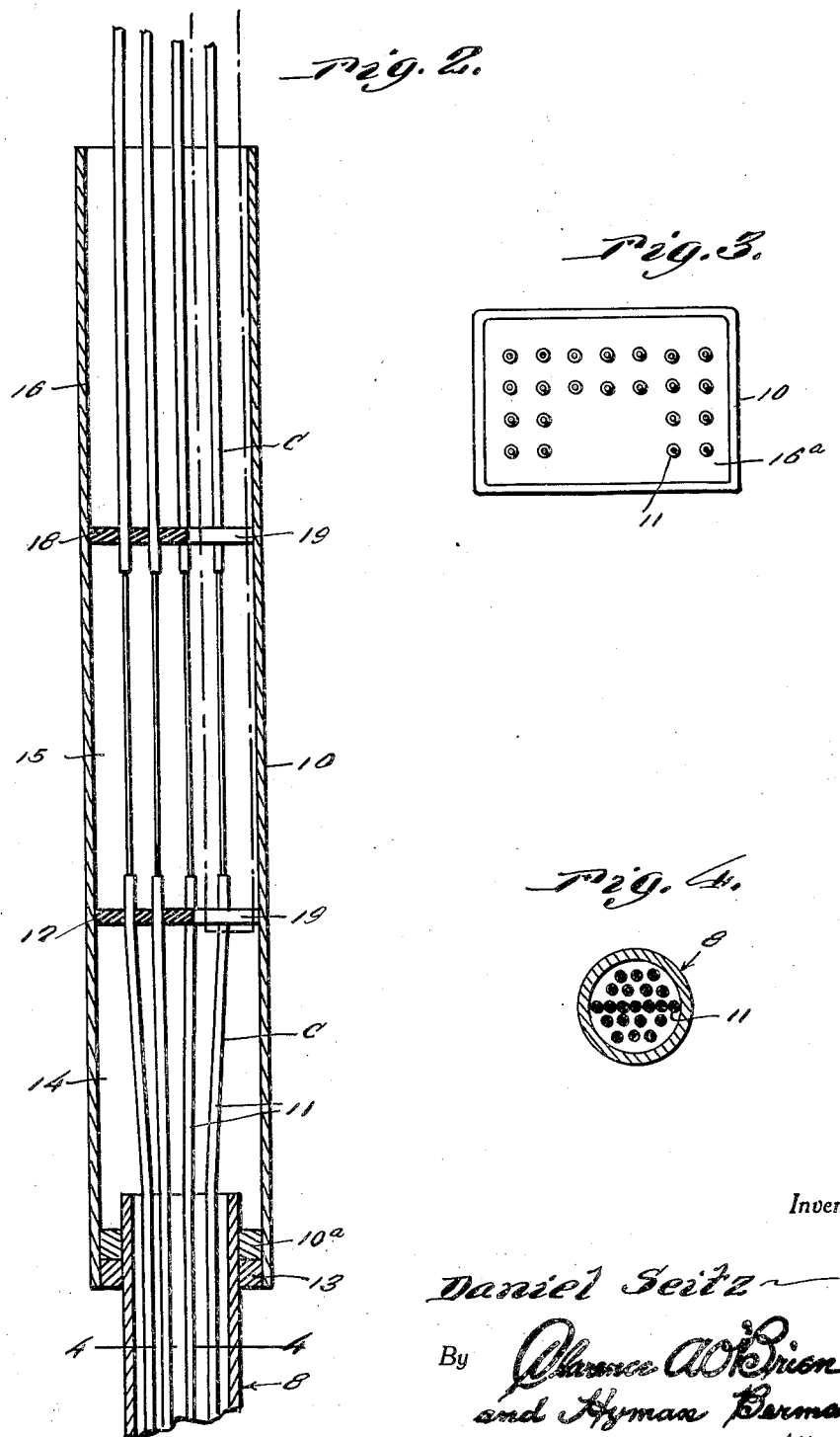

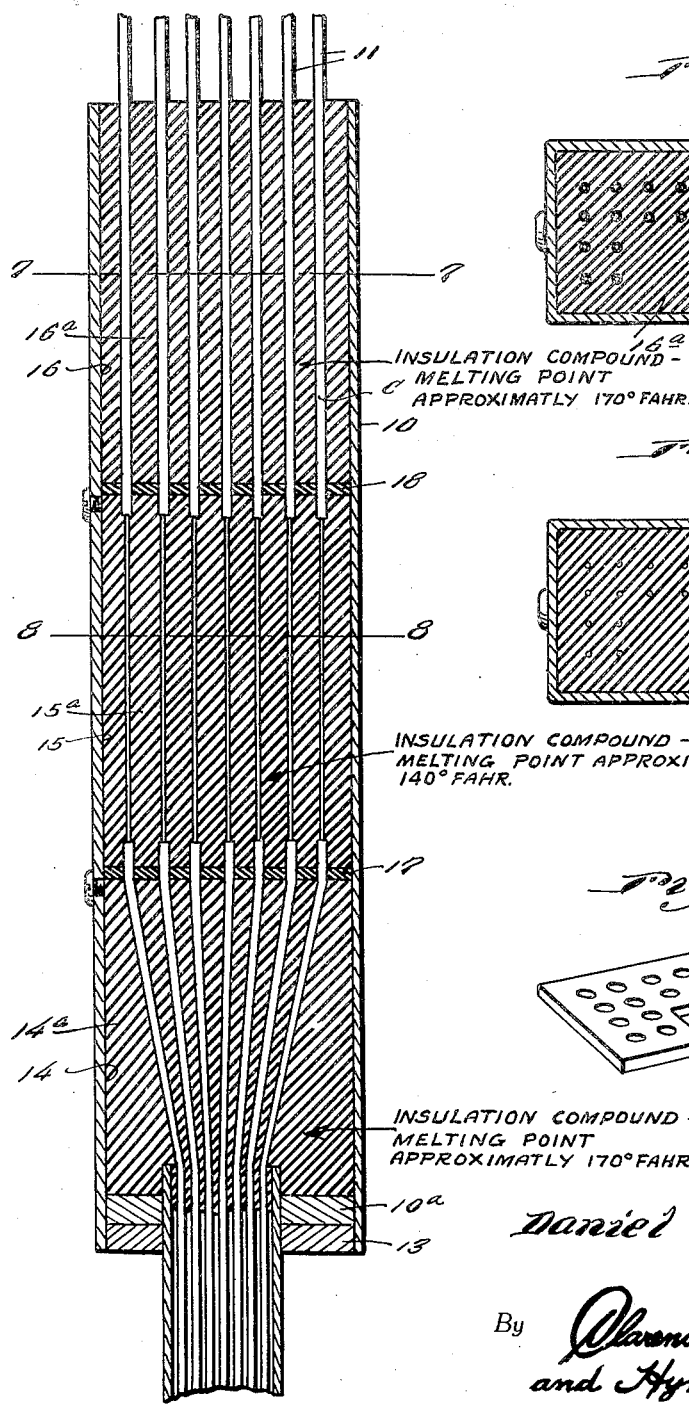
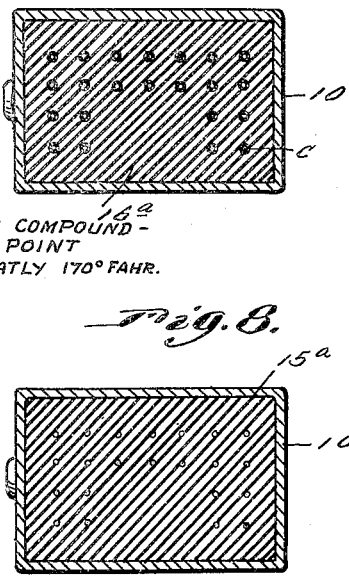
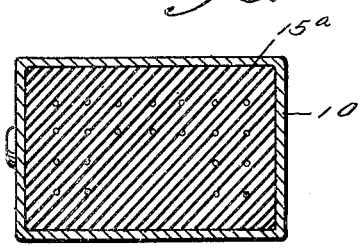
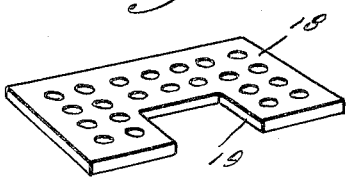

Patented Feb. 25, 1941

2,232,872

UNITED STATES PATENT OFFICE 2,232,872

CABLE SEALING MEANS

Daniel Seitz, York, Pa.

Application May 25, 1938, Serial No. 210,083

2 Claims. (Cl. 174—23)

This invention appertains to new and useful improvements in sealing means for cable terminals and more particularly to a cable sealing chamber for use in connection with or as part of any telephone cable terminal for the purpose of holding the cable under constant gas pressure and to provide a means of detecting leaks in cables for operating alarms in the event of leak, thus preventing moisture from entering at the leaks.

The principal object of the present invention is to provide a cable sealing chamber for terminal boxes to protect that portion of the cable which extends from the main cable to the box.

Other objects and advantages of the invention reside in the method of construction as well as the manner of construction and these will become apparent to the reader of the following specification.

In the drawings:

Figure 1 represents a diagrammatic view showing the main cable with the branch extensions to the outlet boxes which are shown in section.

Figure 2 is a vertical sectional view through the sealing chamber before having been filled.

Figure 3 is a top plan view of the chamber.

Figure 4 is a cross section on the line 4—4 of Figure 2.

Figure 5 is a perspective view of one of the separators.

Figure 6 is a vertical sectional view through the completed chamber.

Figure 7 is a cross section on the line 7—7 of Figure 6.

Figure 8 is a cross section on the line 8—8 of Figure 6.

Referring to the drawings wherein like numerals designate like parts, it can be seen that numeral 5 generally refers to a conventional cable, such as a telephone cable, for instance, which at predetermined intervals is interrupted by a gas plug 6 which prevents gas from one section, for instance, section $a$ from passing to the section $b$. Thus the sections $a$ and $b$ and the other sections are independent gas carriers and each is equipped with suitable gauges and alarms (not shown).

Numeral 7 denotes terminal boxes such as are mounted on telephone poles and which encompass the terminals of branch extensions generally referred to by numeral 8 from the main cable 5. In carrying out the present invention, it is desired that these extensions 8 be protected in the same manner as the main cable and consequently they are charged with a gas pressure and it is the province of the assembly generally referred to by numeral 9 to act as a seal for the terminal box of the extensions 8 to prevent leakage of the gas with which the extensions 8 will be charged.

The terminal boxes 7 are of conventional design and each assembly 9 includes a case 10 which extends for approximately half of its length into the box.

The case 10 can be of brass, copper, zinc, lead, etc., but preferably of a substance which can be adequately secured to the extensions 8, preferably by soldering.

Numeral 11 represents the conductors which extend from the cable 5 and through the extensions 8 and these pass through the case 10 to suitable binding posts or terminal members of lighting arresters and other devices that may be installed in the terminal box 7.

As can be seen in Figure 2, each cable extension 8 extends into the lower end of the case 10 through the bottom 10a, the bottom being located slightly above the lower end of the case to define a pocket for the reception of solder 13.

The interior of the case 10 is divided into three chambers 14, 15 and 16 which are defined by the separators 17 and 18 of suitable insulating material.

Each of these separators 17 and 18 is provided with an opening extending inwardly from one edge thereof and denoted by numeral 19.

The insulation $c$ of the wires 11 is removed from the wire so that the wires are bare in the chamber 15.

It can now be seen, that with a suitable dispensing instrument that will extend into the case 10 to terminate within the chamber 14, the chambers can be filled with the proper substances to both insulate the wire and form a definite seal.

In this connection the dispensing nozzle is extended into the case 10 through the openings 19 in the separators 18 and 17 to terminate within the chamber 14. An insulating compound 14a is deposited in the chamber 14 up to the separator 17 and it may be desirable to have a small opening in the side of the case which can be later plugged which will indicate an overflow of the chamber 14.

The dispensing instrument is now removed and the same is recharged or another used in depositing insulating material 15a in the chamber 15. Subsequently, the uppermost chamber 16 is charged with an amount of insulating material preferably of the kind used in lower chamber 14 and thus the terminal seal has been completed.

It is to be understood that all of the sealing agents in the chambers 14, 15 and 16 have good electrical characteristics and will not break down under normal operating conditions. All of the sealing agents in the chambers have a softening or melting point high enough to allow for exposure to the summer sun without becoming soft or melting.

It is furthermore to be understood that the sealing substance in chambers 14 and 16 represents a compound having a softening point of over 170 degrees Fahrenheit, while the compound in the chamber 15 has a softening point of approximately 140 degrees Fahrenheit. In other words, the chambers 14 and 16 serve substantially as anchoring chambers for the substance in the chamber 15 which has a greater property as a sealing agent because of its lower softening point.

Thus it can be seen, that there can be no leakage of the gas from the cable extension 8 by way of the sealing assembly 9, nor can there be any pull of the sealing substances into the cable extension 8 in the event a suction should occur in the extension by reason of a leak or some other circumstances.

It is to be understood that while the boxes 7 are shown in conjunction with the case type of seals shown, it is practicable to build the sealing structure directly into the box or as part of the box 7.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In combination with a cable terminal box, a seal to prevent the escape of gas from a gas filled cable connected to the terminal box comprising a container having a plurality of compartments through which the individually wrapped insulated conductors of the cable pass, a mounting at one end of said container for receiving the cable casing and terminating it at the first compartment, an insulating compound in said first compartment for sealing the end of said terminal casing, said conductors passing through and being anchored by said compound and having their insulated wrappings stripped therefrom for a limited distance in the next compartment to expose limited bare portions thereof, and a compound of lower melting point in said next compartment for sealing said bare portions of said conductors and for sealing said insulation wrappings at their ends adjacent said bare portions to prevent the escape of gas tending to creep along said wrappers beyond the seal formed by said first compound at said end of said cable casing.

2. In combination with a cable terminal box, a seal to prevent the escape of gas from a gas filled cable adapted to be connected to the terminal box comprising a container having a plurality of compartments through which individually wrapped conductors of the cable extend, the wrappings of said conductors being stripped therefrom a predetermined distance in an intermediate compartment to expose therein bared portions of said conductors, and a compound for each compartment, the compound in said intermediate compartment being of a low melting point and sealing said bared portions and the ends of said wrappings adjacent said bared portions, the compounds in the outer compartments being of a higher melting point and embedding therein said conductors with their wrappings thereon.

DANIEL SEITZ.